United States Patent

[11] 3,585,635

[72] Inventor Paul A. Reiling
New Providence, N.J.
[21] Appl. No. 786,250
[22] Filed Dec. 23, 1968
[45] Patented June 15, 1971
[73] Assignee Bell Telephone Laboratories, Incorporated
Murray Hill, Berkeley Heights, N.J.

[54] ANALOG-TO-DIGITAL CONVERTER
12 Claims, 6 Drawing Figs.

[52] U.S. Cl. .......... 340/347
[51] Int. Cl. .......... H03k 13/175
[50] Field of Search .......... 340/347, 169; 328/14, 146, 147, 148, 149, 150, 151; 307/235

[56] References Cited
UNITED STATES PATENTS

| | | | |
|---|---|---|---|
| 3,241,135 | 3/1966 | Kuflik et al. .......... | 340/347 |
| 3,458,721 | 7/1969 | Maynard .......... | 307/235 |

*Primary Examiner*—Maynard R. Wilbur
*Assistant Examiner*—Charles D. Miller
*Attorneys*—R. J. Guenther and Kenneth B. Hamlin

ABSTRACT: Parallel transistor-resistor combinations are respectively connected into two conduction paths supplied by a constant current source, and a sampled analog input signal is applied in common to the base terminals of the transistors. Voltage pairs defining predetermined voltage intervals are applied to the respective emitters of the transistors such that one of the transistors is turned ON if the input signal is within one of the predetermined voltage intervals. A difference circuit bridged across the collectors of the transistors yields an output representative of a binary digit.

INVENTOR
P. A. REILING
BY D. E. Snedeker
ATTORNEY

ANALOG-TO-DIGITAL CONVERTER

BACKGROUND OF THE INVENTION

This invention relates to data translation systems and, more specifically, to arrangements for converting an analog signal into a binary digital code.

In many electrical systems it is desired to represent an analog signal as a series of binary words, that is, as a sequence of ON and OFF pulses. Typically, to accomplish this, the input analog signal is sampled and encoded by an analog-to-digital converter for transmission in the form of a multidigit binary word.

Numerous arrangements for analog-to-digital conversion are disclosed in the prior art. One group of known converters, appropriately termed "digit-at-a-time" encoders, rely on repeated comparisons of the analog input signal with fixed voltage levels to generate successive digits of a representative binary word. Besides being structurally complex, "digit-at-a-time" encoders are hampered by limited speed, since only one binary digit can be generated at a time.

Another class of prior art converters, generally known as electron beam tube encoders, can be constructed to generate all the digits of a representative binary word simultaneously. While thus overcoming the speed limitations of "digit-at-a-time" converters, tube encoders are large and fragile, and require precision manufacture and adjustment. Furthermore, high-level wideband amplifiers are required to drive the deflection circuits of the cathode-ray tube, and to amplify the digit pulses.

The analog-to-digital converter disclosed in my copending application Ser. No. 691,475, filed Dec. 18, 1967, while generally satisfactory in overcoming many of the shortcomings of previous converters, is somewhat complex and requires a considerable amount of circuitry for generation of multidigit binary words.

SUMMARY OF THE INVENTION

Accordingly, it is an object of this invention to provide an improved, high-speed analog-to-digital converter.

It is another object of this invention to provide a sturdy, compact and inexpensive analog-to-digital converter, having a minimum of circuitry and components.

It is yet another object of this invention to provide an arrangement for simultaneously generating a plurality of binary digits representative of the amplitude of an analog signal.

It is still another object of this invention to provide an analog-to-digital converter which can be manufactured utilizing integrated circuitry.

An analog-to-digital converter in accordance with this invention utilizes the basic "decision circuit" arrangement disclosed in my copending application, mentioned above, for generating each digit output. Each decision circuit comprises two transistors respectively connected in shunt with individual resistors of equal magnitude. The transistor-resistor combinations are connected in parallel, and a current source is connected to one end of each parallel combination. A pair of waveform generators are connected respectively to the emitter electrodes of the transistors in the two paths in such a way that, during each cycle of the waveform generators, pairs of voltage levels are synchronously applied to the emitter electrodes, the voltage pairs being arranged to comprise predetermined intervals of voltage. The analog input signal is applied in common to the base electrodes of the transistors, and the output is obtained from a difference circuit connected between the collector electrodes of the transistors.

If the input signal lies within one of the intervals of voltage defined by the voltage pairs applied to the two transistor paths, one of the two transistors is turned ON, shunting its parallel resistor and the difference circuit generates an output representative of a binary "1." If the input signal does not lie within any of these voltage intervals, the transistors are either both ON or both OFF at all times, and the difference circuit generates an output signifying a binary "0." By applying different combinations of predetermined waveforms, defining different voltage intervals, respectively to a plurality of decision circuits, a multibit binary word is generated.

In accordance with another aspect of the invention an even more compact analog-to-digital converter is obtained by applying a sequence of different waveforms, defining the different voltage intervals, to a single decision circuit in order to generate the digits of a multibit word in succession.

Advantageously, therefore, the structure of an analog-to-digital converter according to this invention is relatively simple and compact, and contains a minimal number of components which require precision values. In addition, being composed entirely of solid-state components and resistors, it can be fabricated easily via known integrated circuit techniques.

BRIEF DESCRIPTION OF THE DRAWING

The invention may be more readily understood by reference to the following detailed description thereof, taken in conjunction with the accompanying drawing, in which.

DETAILED DESCRIPTION

Figure 1:
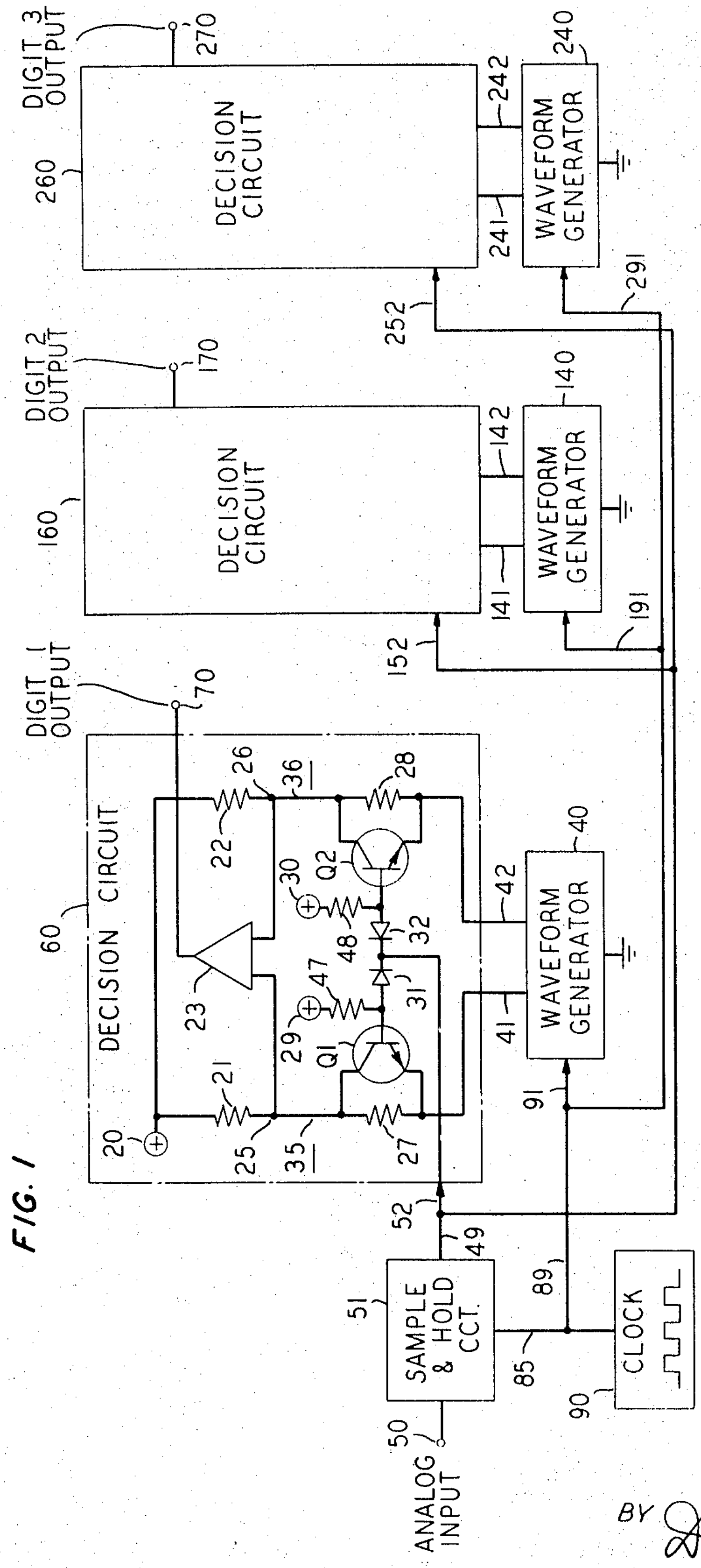
FIG. 1 is a schematic diagram of an illustrative multibit analog-to-digital converter in accordance with the invention.

An illustrative analog-to-digital converter in accordance with this invention for generating a 3-bit Gray code binary word is shown in FIG. 1. The analog input signal is applied over input lead 50 to sample and hold circuit 51. Sample and hold circuit 51, which may comprise any of the known forms of sample and hold circuits, is activated by pulses on lead 85 from clock 90. In response to each pulse from clock 90, sample and hold circuit 51 samples the input signal on lead 50 and holds the value of the signal until the next pulse is received from clock 90. The output of sample and hold circuit 51 on lead 49 is transmitted via respective leads 52, 152, and 252 to each of decision circuits 60, 160, and 260.

The output of clock 90 is also directed via lead 89 and respective leads 91, 191, and 291 to waveform generators 40, 140, and 240. The outputs of generators 40, 140, and 240 are connected over respective pairs of leads to decision circuits 60, 160, and 260. Thus, waveform generators 40, 140, and 240 are connected, respectively, over leads 41 and 42, leads 141 and 142, and leads 241 and 242, to decision circuits 60, 160, and 260, respectively. The three Gray code binary output digits of decision circuits 60, 160, and 260 are provided on respective leads 70, 170, and 270, the output on lead 70, designated "digit 1," being the most significant digit and the output on lead 270, designated "digit 3," being the least significant digit.

Decision circuit 60 includes a pair of transistors $Q_1$ and $Q_2$ connected respectively in parallel with resistors 27 and 28 of like magnitude. One parallel transistor-resistor combination, including transistor $Q_1$ and resistor 27 is connected in conduction path 35, which is connected at one end through resistor 21 to potential source 20 and at the other end to lead 41 from waveform generator 40. The other transistor-resistor combination, including transistor $Q_2$ and resistor 28, is connected in conduction path 36, which is connected at one end through resistor 22 to potential source 20 and at the other end to lead 42 from waveform generator 40. Resistors 21 and 22 are assumed to be substantially equal and of such magnitude that the current supplied by source 20 to each of paths 35 and 36 is substantially constant.

The output of sample and hold circuit 51 on lead 49 is applied over lead 52 to the bases of transistors $Q_1$ and $Q_2$ through gating diodes 31 and 32, respectively. Sources 29 and 30 are also connected through resistors 47 and 48 to the bases of transistors $Q_1$ and $Q_2$ respectively, to provide gating currents. Difference circuit 23, which may comprise for example a differential amplifier, is connected between points 25 and 26 of conduction paths 35 and 36, respectively, and provides the binary digit output on lead 70.

Decision circuits 60, 160, and 260 in FIG. 1 are substantially identical and generate, respectively, digit 1, digit 2, and digit 3 of a Gray code binary word in response to comparisons with reference voltage pairs generated by waveform generators 40, 140, and 240. Thus, decision circuit 60 generates a voltage output on lead 70 representative of a binary "1" when the voltage level on lead 52 is between the voltage level on lead 42 and the voltage level on lead 41. A voltage output representative of a binary "0" is generated on lead 70 when the voltage level on lead 52 is above or below the voltage levels on both of leads 41 and 42. If, for example, the voltage level on lead 52 is below the voltage levels on both lead 41 and lead 42, the respective base-emitter junctions of transistors $Q_1$ and $Q_2$ are reverse-biased, and both transistors $Q_1$ and $Q_2$ are nonconductive. The constant currents in paths 35 and 36 therefore flow entirely through respective resistors 27 and 28, which are of equal magnitude. Accordingly, difference circuit 23 generates a particular voltage output $V_1$, representative of a binary "0," on lead 70. Similarly, if the voltage level on lead 52 is greater than the voltage levels on leads 41 and 42, transistors $Q_1$ and $Q_2$ are both rendered conductive and in effect short circuit respective equal resistors 27 and 28. Thus difference circuit 23, measuring the difference in voltage between points 25 and 26, again generates a $V_1$ output, representative of a binary "0."

If, on the other hand, the voltage level on lead 52 is greater than the voltage level on lead 42 but less than the voltage level on lead 41, transistor $Q_2$ alone is rendered conductive. Thus, in effect, resistor 28 is short circuited in path 36 while resistor 27 remains connected in path 35. With resistor 28 alone short circuited, the voltage relationship between points 25 and 26 is altered, and difference circuit 23 generates an output voltage $V_2$, representative of a binary "1," on lead 70.

Accordingly, for pairs of reference voltage levels applied to leads 41 and 42, respectively, decision circuit 60 "decides" if the voltage on lead 52 is within the voltage interval defined by the voltage pairs and, if so, generates an output representative of a binary "1" on lead 70. If the voltage on lead 52 is outside the interval defined by the voltages on leads 41 and 42, an output representative of a binary "0" is generated on lead 70.

Figure 2C:
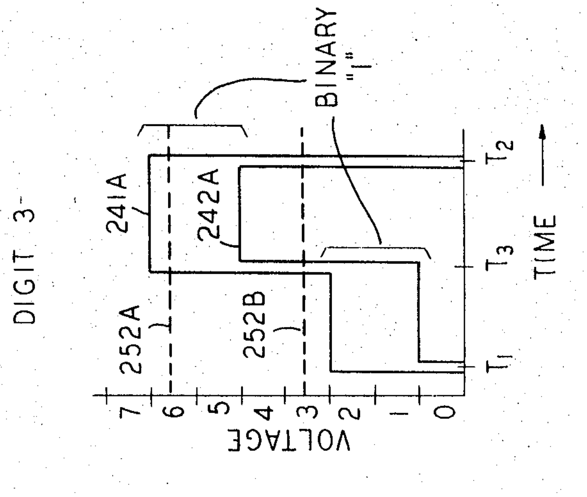
FIGS. 2A, 2B and 2C show several waveforms useful in describing the operation of the circuit shown in FIG. 1.
Figure 2B:
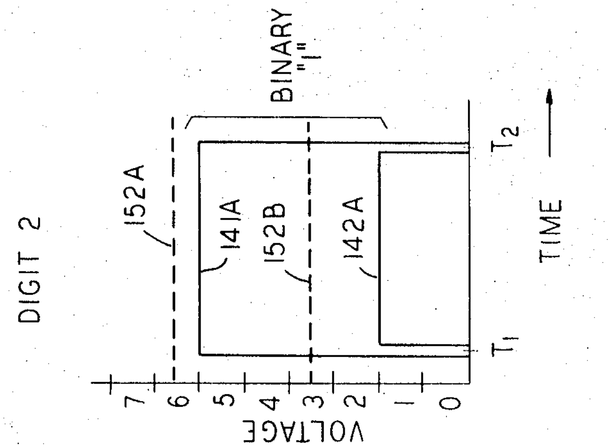
Figure 2A:
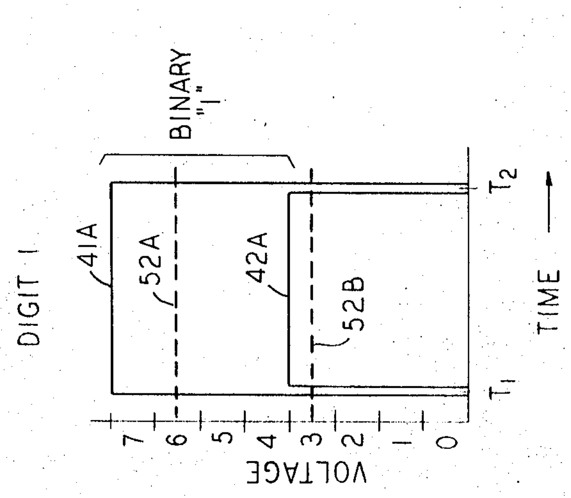

A single sequence of reference voltage waveforms provided to decision circuits 60, 160, and 260 by waveform generators 40, 140, and 240 is shown in FIGS. 2A, 2B, and 2C, respectively. The vertical axes of FIGS. 2A, 2B, and 2C are divided into eight equal voltage intervals which are designated by integers "0" through "7" as quantized values of voltage. Waveform generator 40 provides a signal on lead 42 shown in FIG. 2A as waveform 42A and a signal on lead 41 shown as waveform 41A. Waveform generator 140 provides signals on leads 141 and 142 shown in FIG. 2B as waveforms 141A and 142A, respectively, and waveform generator 240 provides signals on leads 241 and 242 shown in FIG. 2C as waveforms 241A and 242A, respectively. A complete sequence or cycle of waveform generators 60, 160, and 260 in response to a clock pulse is represented in FIGS. 2A, 2B, and 2C between times $T_1$ and $T_2$. A transition or step occurs in waveforms 241A and 242A at time $T_3$ in FIG. 2C, thereby defining two separate voltage intervals between times $T_1$ and $T_2$. Thus, a binary "1" is indicated by decision circuit 260 if the sampled analog input voltage falls either within the voltage interval defined between times $T_1$ and $T_3$ or within the voltage interval defined between times $T_3$ and $T_2$ in FIG. 2C, even though in either case the digit 3 output on lead 270 does not last for the entire period between times $T_1$ and $T_2$.

Figure 3:
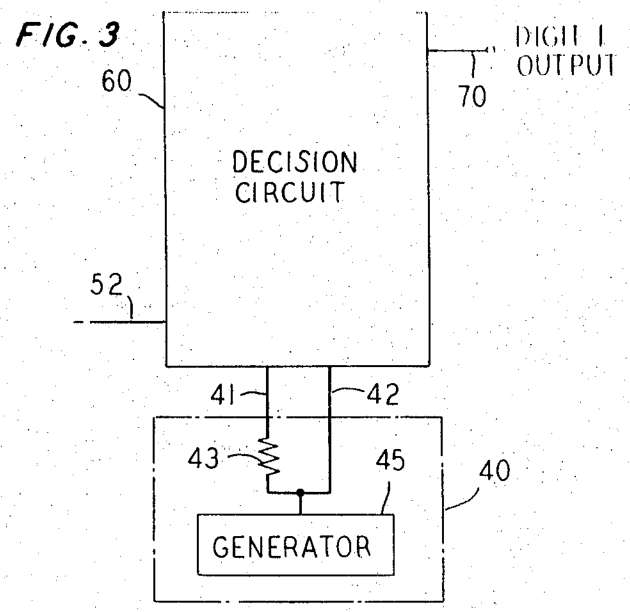
FIG. 3 shows an illustrative embodiment of a waveform generator used in FIG. 1.

Waveform generators 40, 140, and 240 may be constructed as shown illustratively in FIG. 3, waveform generator 40 comprising signal generator 45 which is connected directly to lead 42 and to lead 41 through resistor 43, resistor 43 providing the voltage difference between leads 41 and 42 as shown in FIG. 2A. Similarly, waveform generators 140 and 240 could include resistors to provide the voltage differences between the waveforms shown in FIGS. 2B and 2C.

To illustrate the operation of the converter shown in FIG. 1, assume that an input voltage sample having a quantized value of "6" is applied by sample and hold circuit 51 via lead 49 to respective leads 52, 152, and 252. This input voltage, shown as dashed line 52A in FIG. 2A, falls within the interval defined by the voltages applied to leads 41 and 42 by waveform generator 40, and accordingly decision circuit 60 delivers a digit 1 output representative of a binary "1" on lead 70. As shown by dashed line 152A in FIG. 2B, the input voltage lies above the voltage on lead 141 and hence outside the interval defined by the voltages on leads 141 and 142. Accordingly, a digit 2 output representative of a binary "0" is delivered by decision circuit 160 on lead 170. As shown by line 252A in FIG. 2C, the input voltage lies outside the interval defined by the voltages on leads 241 and 242 between times $T_1$ and $T_2$, but inside this interval between times $T_2$ and $T_3$. Accordingly, since the input voltage lies within one of the two voltage intervals defined by waveform generator 240, a digit 3 output representative of a binary "1" is provided by decision circuit 260 on lead 270. Thus the digital output of the converter on leads 70, 170, and 270 forms the binary word "101," which in Gray code represents the number "6" in the decimal system.

To further illustrate the operation of the converter, assume that a voltage sample having a quantized value of "3" is provided by circuit 51. As shown by dashed lines 52B, 152B, and 252B in FIGS. 2A, 2B, and 2C, respectively, decision circuit 60 provides a binary "0" output, decision circuit 160 provides a binary "1" output and decision circuit 260 provides a binary "0" output. The resulting binary word "010" on lines 70, 170, and 270, corresponds in the Gray code to the decimal number "3."

Similarly, for any level of signal provided on lead 49 by sample and hold circuit 51, decision circuits 60, 160, and 260 generate the three digit Gray code binary equivalent on leads 70, 170, and 270. Thus the converter of FIG. 1 provides a Gray code binary representation of the magnitude of a signal applied to lead 50 during each cycle of sample and hold circuit 51 under control of clock 90.

If additional decision circuits and waveform generators are employed, an analog-to-digital converter in accordance with the invention may be constructed to generate Gray code binary words having more than three bits. The output signals of the additional waveform generators must, of course, provide different reference voltages to the respective decision circuits. For example, in a 4-bit Gray code converter the fourth waveform generator provides reference voltages to a digit 4 decision circuit such that a binary "1" is generated for input signals appearing in relative voltage intervals 1 and 2, 5 and 6, 9 and 10, and 13 and 14. Moreover, in a 4-bit converter, waveform generators corresponding to generators 40, 140, and 240 in FIG. 1 generate respective reference voltages such that digit 1 is a binary "1" for input signals in voltage intervals 8 through 15, digit 2 is a "1" for signals in intervals 4 through 11, and digit 3 is a "1" for signals in intervals 2 through 5 and 10 through 13.

Although the converters described above generate the Gray code representation of an analog input signal, it will be apparent that by applying other reference voltage intervals converters may be devised to generate any other binary digital code.

Figure 4:
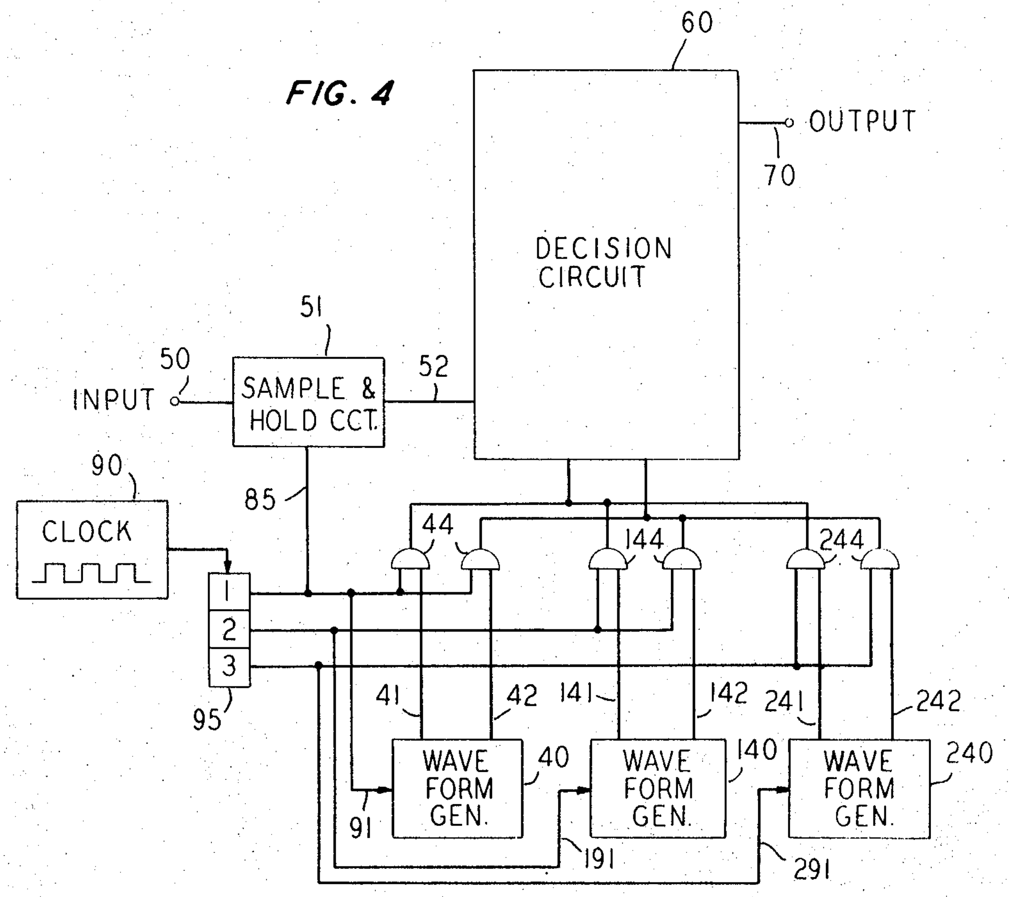
FIG. 4 shows an illustrative analog-to-digital converter in accordance with the invention for generating the digits of a multibit word in sequence.

An alternative illustrative arrangement utilizing a single decision circuit for generating the bits of a Gray code word in sequence is shown in FIG. 4, wherein the similarly numbered components are identical to those shown in FIG. 1. In FIG. 4 decision circuit 60 is connected via AND gate pairs 44, 144, and 244, respectively, to waveform generators 40, 140, and 240. Clock 90 provides timed pulses to the count terminal of 3-state ring counter 95, the respective outputs of which are connected to input terminals of AND gate pairs 44, 144, and 244. The outputs of the three states of counter 95 are also connected respectively via leads 91, 191, and 291 to waveform generators 40, 140, and 141, and the output of state "1" of counter 95 activates sample and hold circuit 51 via lead 85.

When counter 95 is shifted into state "1" by clock 90, counter 95 generates a pulse at its state "1" output. This pulse accomplishes three things: it activates sample and hold circuit 51 such that a sample of the input signal on lead 50 is sent to decision circuit 60; via lead 91, it activates waveform generator 91 which provides reference voltages on leads 41 and 42; and it enables AND gates 44, thereby permitting the output of generator 40 on leads 41 and 42 to be sent to decision circuit 60. Thereafter, as described above, decision circuit 60 provides a digit 1 output on lead 70. Similarly, on the next two pulses from clock 90, counter 95 is shifted to states "2" and "3," thereby activating in sequence waveform generators 140 and 240 and gate pairs 144 and 244, respectively, and digit 2 and digit 3 outputs are provided on lead 70. The next pulse from clock 90 shifts counter 95 back to state "1," and the process of signal sampling and converting is repeated.

It is to be understood that the above-described arrangements are merely illustrative of the principles of the present invention. Numerous other arrangements may be devised by those skilled in the art without departing from the spirit and scope of the invention.

I claim:

1. In an analog-to-digital converter, at least one decision circuit comprising: first and second conduction paths, first and second impedance means serially included respectively in said first and second conduction paths, first means connected in parallel with said first impedance means and having a first input voltage terminal, the operation of said first means shunting said first impedance means, second means connected in parallel with said second impedance means and having a second input voltage terminal, the operation of said second means shunting said second impedance means, a common input terminal connected to said first and second input voltage terminals, difference output means connected to said first and second conduction paths, and means for supplying constant current connected to said first and second conduction paths; and waveform generation means connected to said first and second conduction paths for selectively operating one of said first and second means when a voltage applied to said common input terminal is within one of a plurality of predetermined intervals of voltage.

2. An analog-to-digital converter in accordance with claim 1 wherein said waveform generation means comprises means for connecting said waveform generation means to apply a plurality of predetermined waveform pairs in sequence to said first and second conduction paths, first and second waveforms of each of said plurality of predetermined waveform pairs being synchronously applied to said first and second conduction paths, respectively.

3. An analog-to-digital converter in accordance with claim 1 herein said first and second means comprise respectively first and second transistors whose individual collector and emitter electrodes are connected respectively in parallel with said first and second impedance means; and wherein said first and second input voltage terminals are individually connected to the respective base electrodes of said first and second transistors.

4. An analog-to-digital converter in accordance with claim 3 wherein said output means comprises a difference circuit connected to collector terminals of said transistors.

5. An analog-to-digital converter in accordance with claim 3 wherein said waveform generation means comprises first and second waveform generators connected to the emitter terminals respectively of said first and second transistors.

6. An analog-to-digital converter in accordance with claim 3, wherein said waveform generation means comprises a waveform generator having an output connected to said first conduction path, and a resistor, said resistor being connected between said output and said second conduction path.

7. An analog-to-digital converter in accordance with claim 1 wherein said waveform generation means includes means to apply one constant voltage waveform pair defining a voltage interval to said first and second conduction paths during each time interval of voltage application to said common input terminal.

8. A multibit analog-to-digital converter comprising a plurality of decision circuits individually comprising first and second conduction paths, first and second transistors connected respectively in said first and second conduction paths, through the collector and 9. An analog-to-digital converter in accordance with claim 7 wherein said waveform generators for at least one decision circuit generate one predetermined interval of voltage with respect to the reference voltage level during each sampling time interval.

10. An analog-to-digital converter in accordance with claim 7 wherein said waveform generators for at least one decision circuit comprise a means for generating a sequential plurality of predetermined intervals of voltage with respect to the input voltage reference level during each sampling time interval, and where the first and second voltage waveforms defining each voltage interval are synchronously coupled to the first and second conduction paths, respectively.

11. An analog-to-digital converter in accordance with claim 7 wherein said waveform generators include means defining said predetermined intervals of voltage to provide a coded binary representation of the input voltage magnitude directly from outputs of said difference output means, collectively.

12. An analog-to-digital converter including a decision circuit comprising first and second transistors connected respectively in first and second conduction paths through the collector and emitter terminals of said transistors, first and second resistors connected in parallel respectively with said first and second transistors, means for supplying constant current to said paths, difference output means connected to said paths, and an input terminal connected in common to the base terminals of said transistors; sampling means connected to said input terminal; means for generating a plurality of predetermined waveform pairs, means for connecting said waveform generating means to apply said plurality of predetermined waveform pairs in sequence to said first and second conduction paths, first and second waveforms of each of said plurality of predetermined waveform pairs being synchronously applied to said first and second conduction paths respectively.

UNITED STATES PATENT OFFICE
CERTIFICATE OF CORRECTION

Patent No. 3,585,635 Dated June 15, 1971

Inventor(s) Paul A. Reiling

It is certified that error appears in the above-identified patent and that said Letters Patent are hereby corrected as shown below:

After line 5 of claim 8, the following lines, which were inadvertently omitted in printing the patent, should be added:

6 emitter terminals of said transistors, first and second
7 impedances connected in parallel respectively with said
8 first and second transistors, means for supplying current to
9 said paths, difference output means connected to said
10 paths, and an input terminal connected in common to the base
11 terminals of said transistors; a plurality of waveform
12 generators operative for generating predetermined intervals
13 of voltage connected to said conduction paths of
14 respective ones of said plurality of decision circuits,
15 input signals sampling means connected in common to said
16 input terminals of each of said plurality of decision
17 circuits; and means for periodically operating waveform
18 generators and said sampling means.

Signed and sealed this 16th day of November 1971.

(SEAL)
Attest:

EDWARD M.FLETCHER,JR.
Attesting Officer

ROBERT GOTTSCHALK
Acting Commissioner of Patents

FORM PO-1050 (10-69)
USCOMM-DC 60376-P69
U.S. GOVERNMENT PRINTING OFFICE 1969 O - 366-334